(12) United States Patent
Minakawa

(10) Patent No.: US 8,780,094 B2
(45) Date of Patent: Jul. 15, 2014

(54) IMAGE DISPLAY DEVICE, IMAGE DISPLAY SYSTEM, AND IMAGE DISPLAY METHOD

(75) Inventor: Takuya Minakawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/616,044

(22) Filed: Nov. 10, 2009

(65) Prior Publication Data

US 2010/0118001 A1 May 13, 2010

(30) Foreign Application Priority Data

Nov. 13, 2008 (JP) .................................. 2008-291028

(51) Int. Cl.
*G09G 5/00* (2006.01)
*G06F 3/033* (2013.01)
*H04M 1/00* (2006.01)

(52) U.S. Cl.
USPC .......................... 345/204; 345/157; 455/556.1

(58) Field of Classification Search
USPC ............................................ 345/1.1–2.3, 204
See application file for complete search history.

(56) References Cited

U.S. PATENT DOCUMENTS

| 2003/0098845 A1* | 5/2003 | Hanson et al. ................ 345/156 |
| 2008/0214233 A1* | 9/2008 | Wilson et al. ............... 455/556.1 |
| 2008/0309617 A1* | 12/2008 | Kong et al. .................... 345/157 |
| 2009/0124379 A1* | 5/2009 | Wells .............................. 463/31 |

FOREIGN PATENT DOCUMENTS

JP 2007-316925 A 12/2007

* cited by examiner

*Primary Examiner* — Alexander Eisen
*Assistant Examiner* — Amit Chatly
(74) *Attorney, Agent, or Firm* — Canon U.S.A., Inc. IP Division

(57) ABSTRACT

An image display device includes a coordinates detection unit configured to detect a terminal device which stores image data, and to detect a coordinates of a display unit based on the detected result, a coordinates attribute extraction unit configured to extract an attribute of the coordinates detected by the coordinates detection unit, a communication unit configured to receive the image data from the terminal device, a contents attribute extraction unit configured to extract an attribute of the image data received by the communication unit, and a display control unit configured to display an image which has an attribute similar to the attribute of the coordinates extracted by the coordinates attribute extraction unit among the image data from which the attributes is extracted by the contents attribute extraction unit on a position near a position of the coordinates detected by the coordinates detection unit.

12 Claims, 5 Drawing Sheets

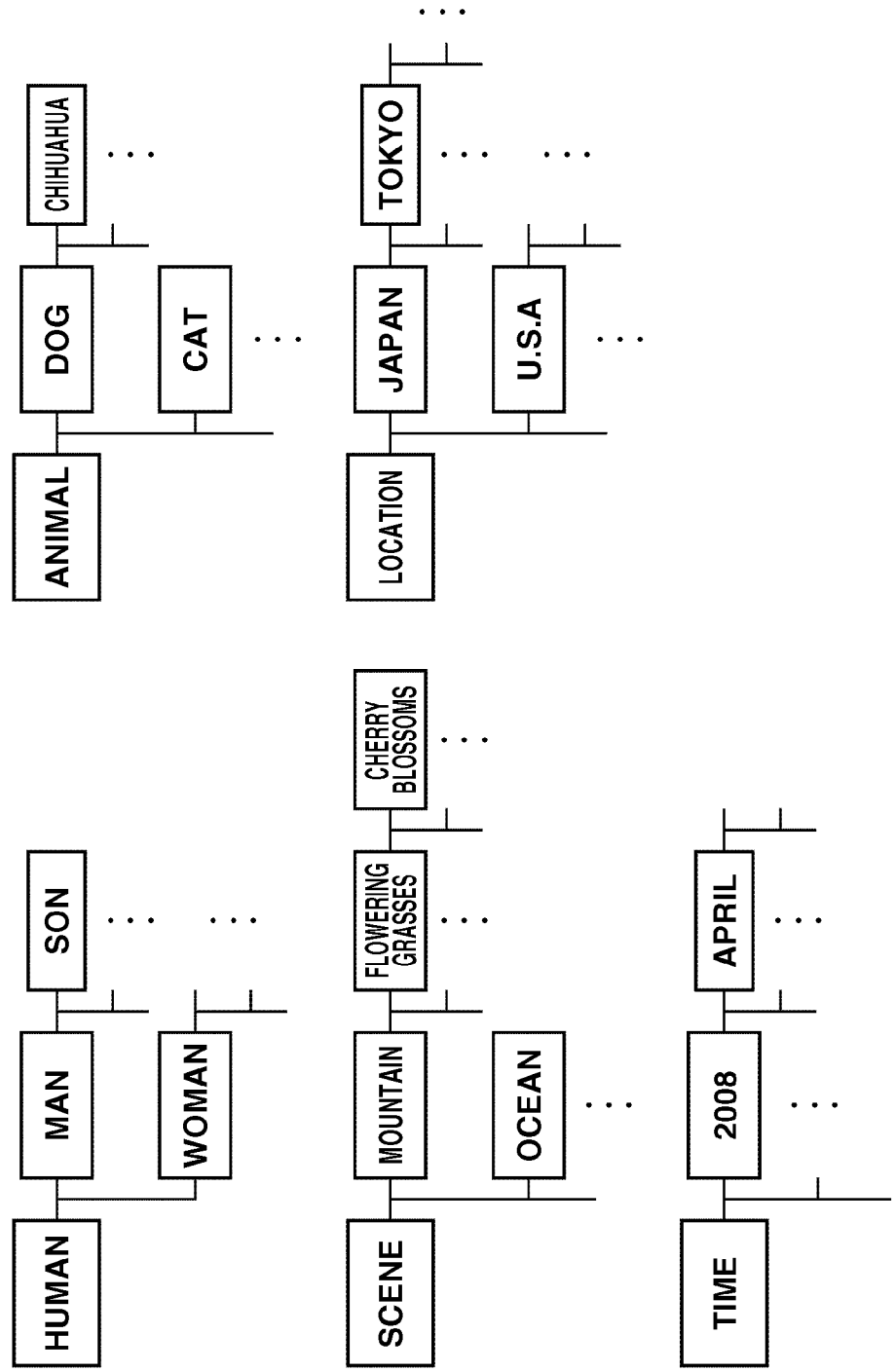

IMAGE DISPLAY DEVICE, IMAGE DISPLAY SYSTEM, AND IMAGE DISPLAY METHOD

BACKGROUND OF THE INVENTION

1. Field of the Invention

The present invention relates to an image display device, an image display system, an image display method, a program, and a storage medium. More particularly, the present invention relates to a technique used for displaying contents stored in a portable terminal or the like.

2. Description of the Related Art

Conventionally, a technique for making a mobile phone in contact with a display and pasting and displaying contents stored in the mobile phone on the display has been known. (See Japanese Patent Application Laid-Open No. 2007-316925)

However, when a large quantity of contents are pasted and displayed on the display, the conventional technique pastes and displays the contents while selecting the contents one by one, and it thus takes much time. Further, an operation for selecting and classifying the contents to be pasted and displayed is complicated, because a screen of the mobile phone is small and difficult to see when a user performs the operation on a portable terminal. Therefore, the conventional technique has a problem of taking time and efforts when a user performs pasting and displaying the contents.

SUMMARY OF THE INVENTION

The present invention is directed to a technique enables a user to easily select contents to paste and display the selected contents on a display.

According to an aspect of the present invention, an image display device includes a coordinates detection unit configured to detect a terminal device which stores image data, and to detect a coordinates of a display unit based on the detected result, a coordinates attribute extraction unit configured to extract an attribute of the coordinates detected by the coordinates detection unit, a communication unit configured to receive the image data from the terminal device, a contents attribute extraction unit configured to extract an attribute of the image data received by the communication unit, and a display control unit configured to display an image which has an attribute similar to the attribute of the coordinates extracted by the coordinates attribute extraction unit among the image data from which the attributes is extracted by the contents attribute extraction unit on a position near a position of the coordinates detected by the coordinates detection unit.

According to an exemplary embodiment of the present invention, a user can select contents which have a similar attribute from a contents group, and easily display the contents. Therefore, the present exemplary embodiment of the present invention can remove a complicated operation for selecting images one by one and pasting these images.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a hierarchically classified attribute category in the exemplary embodiment of the present invention.

DESCRIPTION OF THE EMBODIMENTS

Various exemplary embodiments, features, and aspects of the invention will be described in detail below with reference to the drawings.

A first exemplary embodiment will be described below with reference to the drawings.

Figure 1:
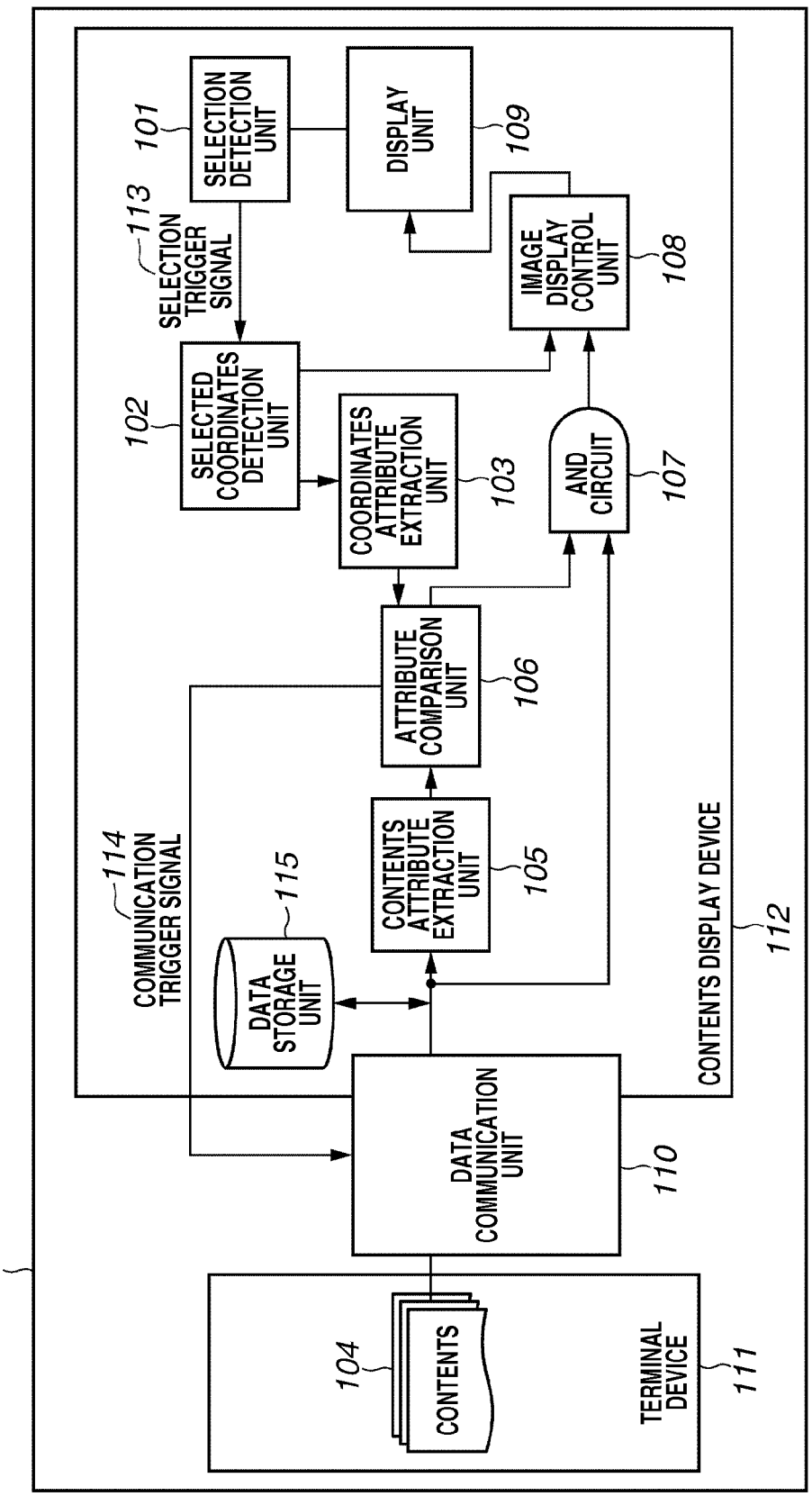
FIG. 1 is a block diagram illustrating a configuration example of an image display system according to an exemplary embodiment of the present invention.

A detection process of contents and a configuration of an image display device in the present exemplary embodiment will be described with reference to a block diagram in FIG. 1 and a flowchart in FIG. 2. FIG. 1 is the block diagram illustrating a configuration example of an image display system 100 according to the present exemplary embodiment.

In FIG. 1, the image display system. 100 of the present exemplary embodiment includes a terminal device 111 which stores a contents group 104, and a contents display device 112 which displays contents. In addition, the terminal device 111 includes a communication unit, e.g., a portable terminal.

A selection detection unit 101 detects whether a coordinates in a display unit 109 is selected by the terminal device 111. A selected coordinates detection unit 102 detects a position of the coordinates selected by the selection detection unit 101. A coordinates attribute extraction unit 103 extracts an attribute of the coordinates position detected by the selected coordinates detection unit 102.

The terminal device 111 stores the contents group 104 (an image data group). A contents attribute extraction unit 105 extracts a contents attribute of the contents group 104 stored in the terminal device 111. An attribute comparison unit 106 is configured to compare the coordinates attribute extracted by the coordinates attribute extraction unit 103 with the contents attribute extracted by the contents attribute extraction unit 105. The attributes comparison unit 106 outputs a signal of "CORRECT" when the coordinates attribute and the contents attribute are similar, and outputs a signal of "ERROR" when the coordinates attribute and the contents attribute are not similar.

An AND circuit 107 is a device configured to output the contents when a result output from the attribute comparison unit 106 is "CORRECT", and not to output anything when the result output from the attribute comparison unit 106 is "ERROR". An image display control unit 108 is configured to control the display unit 109 to display the contents output from the AND circuit 107 thereon. A data communication unit 110 is configured to perform data communication between the terminal device 111 and the contents display device 112.

A selection trigger signal 113 is a signal for determining whether the selection detection unit 101 selects coordinates. A communication trigger signal 114 is a signal for starting communication. A data storage unit 115 is a buffer memory for temporarily storing contents data.

Then, a flow of processing of the present exemplary embodiment will be described. FIG. 2 is a flowchart illustrating an example of processing for displaying the contents in the present exemplary embodiment.

Figure 2:
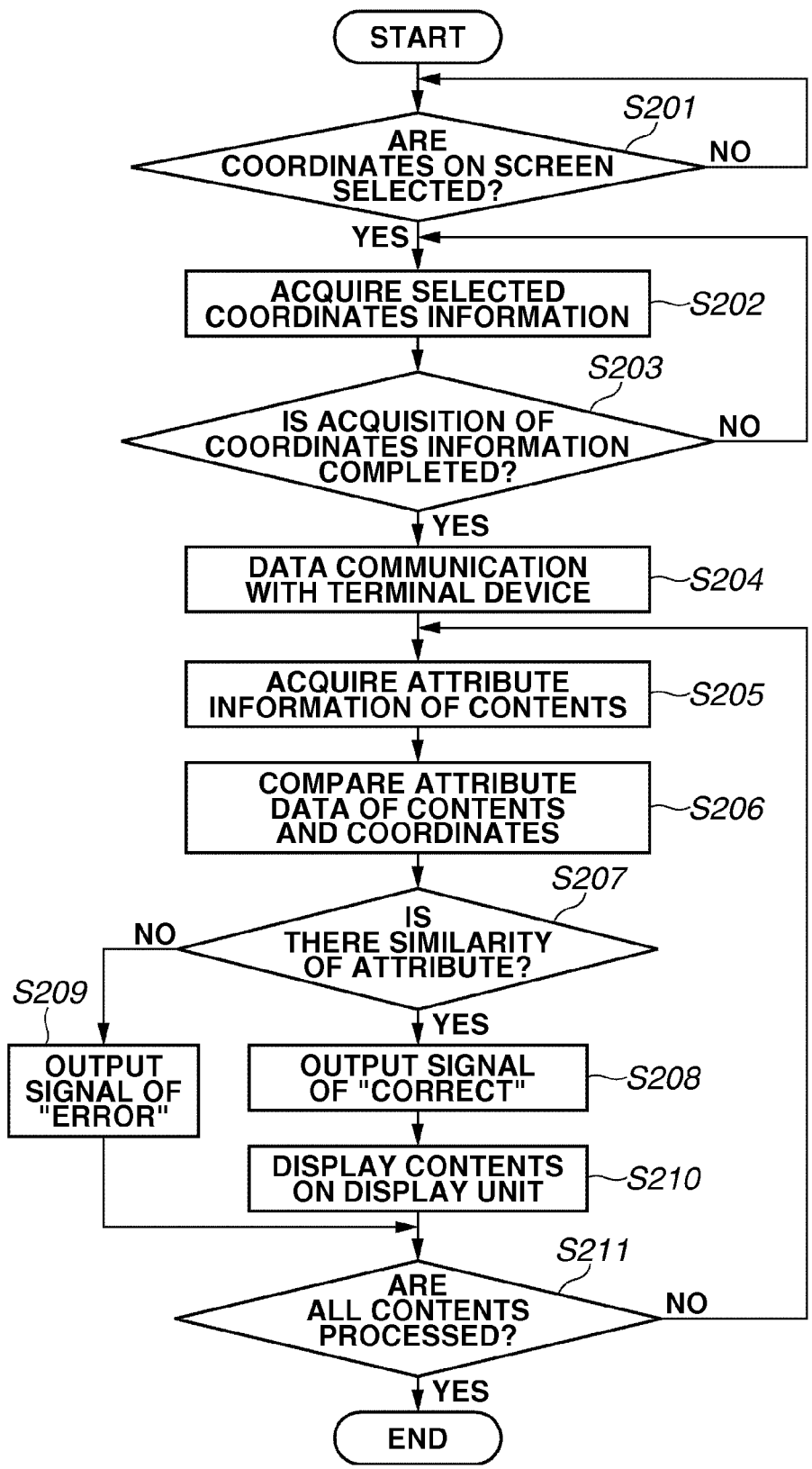
FIG. 2 is a flowchart illustrating an example of processing for displaying contents in the exemplary embodiment of the present invention.

In step S201 in FIG. 2, the selection detection unit 101 determines whether coordinates on a screen is selected. More particularly, the selection detection unit 101 detects whether the terminal device 111 selects coordinates on the screen in display unit 109 by approaching the display unit 109.

When the selection detection unit 101 detects that the terminal device 111 does not select the coordinates (NO in step S201), processing standbys as it is. When the selection detection unit 101 detects that the terminal device 111 selects the coordinates (YES in step S201), processing proceeds to step S202. In step S202, the selection detection unit 101 causes the selected coordinates detection unit 102 to operate using the detection of the selection of the coordinates as a trigger. At this time, a signal input to the selected coordinates detection unit 102 is the selection trigger signal 113. In addition, the selection detection unit 101 performs the detection when the terminal device 111 is in contact with the coordinates on the screen of the display unit 109. Accordingly, the selected coordinates detection unit 102 acquires coordinates information about the selected coordinates. The coordinates information includes information about a coordinates position and a coordinates attribute.

Accordingly, the selection detection unit 102 operates by receiving the selection trigger signal 113 output from the selection detection unit 101, and detects the selected coordinates position. More particularly, the selected coordinates detection unit 102 detects the selected coordinates position by a method using, for example, a pressure sensor. In this method, the selected coordinates detection unit 102 can detect a portion on which pressure is applied by contacting the terminal device 111 as the position of the selected coordinates.

Further, the coordinates attribute extraction unit 103 extracts an attribute of the coordinates detected by the selected coordinates detection unit 102. In the present exemplary embodiment, the attributes are determined for every coordinates. For example, when a screen 401 displays a Japanese map as illustrated in FIG. 4, the coordinates have attributes 402 and 403 of "HOKKAIDO" and an attribute 404 of "TOKYO" on the map.

Figure 4:
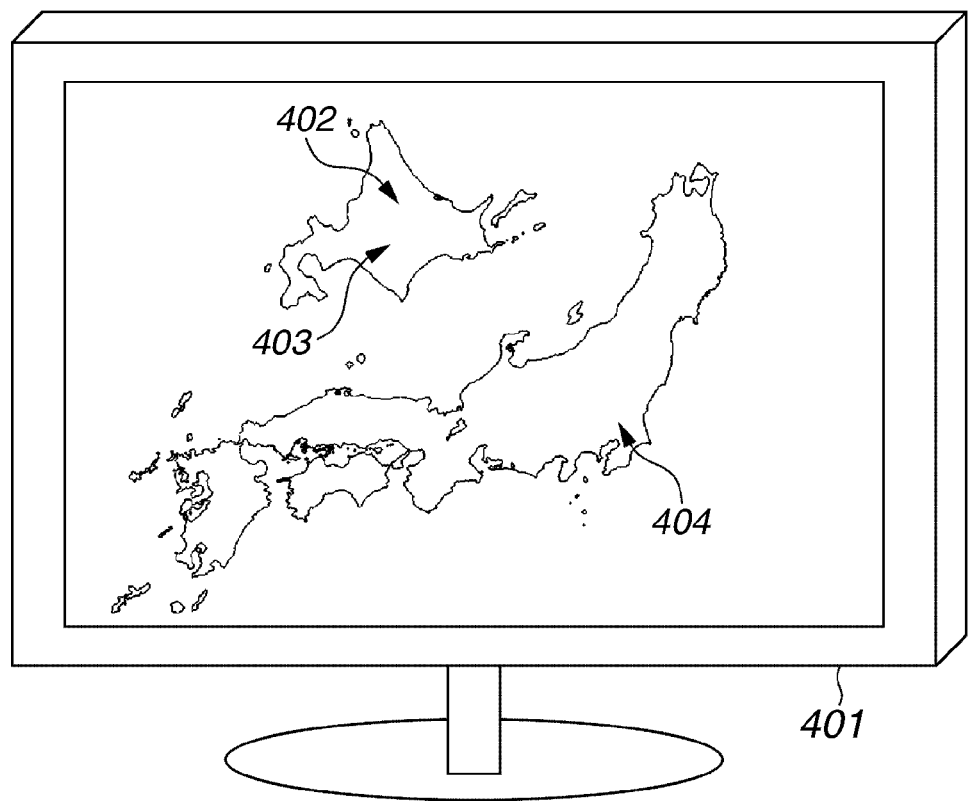
FIG. 4 illustrates a coordinates attribute in a screen of a display unit.

In addition, as for an example other than the example illustrated in FIG. 4, an attribute can be added not only to certain one coordinates but also to an area which is an assembly of coordinates. In the area, all coordinates from a certain coordinates to another coordinates have the same attribute. Further, one coordinates can have a plurality of attributes. For example, when a coordinates have attributes A and B, the relationship between a plurality of attributes can be determined by an AND condition which means A and B or an OR condition which means A or B.

In step S203, the selected coordinates detection unit 102 determines whether acquisition of the coordinates information is completed. When the selected coordinates detection unit 102 determines that the acquisition of coordinates information is not completed (NO in step S203), processing returns to step S202, and the selected coordinates detection unit 102 continues to acquire the coordinates information.

On the other hand, when the selected coordinates detection unit 102 determines that the acquisition of the coordinates information is completed (YES in step S203), processing proceeds to step S204. In step S204, the coordinates attribute extraction unit 103 extracts the coordinates attribute, and outputs attribute data concerning the extracted coordinates attribute to the attribute comparison unit 106. The attribute comparison unit 106 operates the data communication unit 110 using a signal indicating that the attribute data is input to the attribute comparison unit 106 as a trigger. The data communication unit 110 starts data communication between the terminal device 111 and the contents display device 112. At this time, the signal input in the data communication unit 110 is the communication trigger signal 114.

When the data communication unit 110 starts data communication between the terminal device 111 and the contents display device 112, in step S205, the data communication unit 110 sends and receives contents to and from the terminal device 111. More particularly, when the data communication unit 110 operates by receiving the communication trigger signal 114 output from the attribute comparison unit 106, the data communication unit 110 receives contents data one by one from the terminal device 111. Then, the data communication unit 110 outputs the received contents data to the contents attribute extraction unit 105 and the AND circuit 107. In the present exemplary embodiment, the above described processing by the data communication unit 110 is defined as processing (1). The data communication unit 110 can perform data communication using Bluetooth (registered trademark) or an infrared communication.

In step S205, the contents attribute extraction unit 105 acquires attribute information of the contents received from the terminal device 111. More specifically, the contents attribute extraction unit 105 extracts an attribute of each content received in the data communication unit 110. This processing by the contents attribute extraction unit 105 is defined as processing (2).

The contents attribute extraction unit 105 detects the contents attribute by a method referring to metadata included in image contents, or based on a result calculated by comparing a feature of a color or a form of an object of image contents with a sample or a parameter previously prepared on a database. Further, when a plurality of attributes is detected, the contents attribute extraction unit 105 processes the contents as contents having a plurality of attributes.

For example, when the contents attribute extraction unit 105 detects attributes of a image that "a photograph on April, 2008, my son is looking cherry blossoms with a dog in a mountain in Tokyo", the contents attribute extraction unit 105 can extract the following attributes, for example, when the attributes are hierarchically classified into categories illustrated in FIG. 5. The attributes includes HUMAN, MAN, SON, DOG, SCENE, MOUNTAIN, FLOWERING GRASSES, CHERRY BLOSSOMS, JAPAN, TOKYO, 2008, and APRIL. Various categories and hierarchical classifications can be used and FIG. 5 illustrates one example of the various categories and hierarchical classifications.

In step S206, the attribute comparison unit 106 compares the attribute data of the contents with the attribute data of the coordinates. In step S207, the attribute comparison unit 106 determines similarity between these attribute data. More specifically, when the attribute data of contents extracted by the contents attribute extraction unit 105 and the attribute data of coordinates extracted by the coordinate attribute extraction unit 103 are input to the attribute comparison unit 106, the attribute comparison unit 106 performs above described comparison and determination.

By the comparison, when the attribute comparison unit 106 determines that both attributes has the similarity (YES in step S207), processing proceeds to step S208, and the attribute comparison unit 106 outputs a signal of "CORRECT" to the AND circuit 107. On the other hand, when the attribute comparison unit 106 determines that both attributes do not have the similarity (NO in step S207), processing proceeds to step S209, and the attribute comparison unit 106 outputs a signal of "ERROR" to the AND circuit 107. Then, processing proceeds to step S211. The above described processing by the attribute comparison unit 106 is defined as processing (3).

For example, when the coordinates attribute is "SCENE", the attribute comparison unit 106 determines that all contents which have attributes of a lower hierarchy than "SCENE" are similar, in the category illustrated in FIG. 5. Further, the attribute comparison unit 106 determines that contents which do not have the attributes of the lower hierarchy than "SCENE" are not similar. When the coordinates attribute is "FLOWERING GRASSES", the attribute comparison unit 106 determines that all contents which have attributes of a lower hierarchy than "FLOWERING GRASSES" are similar, in the category illustrated in FIG. 5. However, when the contents have only an attribute of "MOUNTAIN" which is an upper hierarchy than "FLOWERING GRASSES", the attribute comparison unit 106 determines that the contents are not similar.

When the coordinates has a plurality of attributes of "FLOWERING GRASSES" and "DOG", and these attributes have a relationship between a plurality of attributes under the AND condition, the attribute comparison unit 106 determines that contents which have attributes of the lower hierarchy than "FLOWERING GRASSES" and attributes of a lower hierarchy than "DOG" are similar, in the category illustrated in FIG. 5. Whereas when the contents have the attribute of "FLOWERING GRASSES" but do not have the attribute of the lower hierarchy than "DOG", the attribute comparison unit 106 determines that the contents are not similar.

When the coordinates has a plurality of attributes of "FLOWERING GRASSES" and "DOG", and these attributes have a relationship between a plurality of attributes under the OR condition, the attribute comparison unit 106 determines that the contents which have attributes of the lower hierarchy than "FLOWERING GRASSES" or "DOG" are similar, in the category illustrated in FIG. 5. Thus, even when the contents do not have the attributes of the lower hierarchy than "DOG" but have the attributes of the lower hierarchy than "FLOWERING GRASSES", the attribute comparison unit 106 determines that the contents are similar.

Accordingly, when the attribute comparison unit 106 searches the all categories to the lowest hierarchical attribute thereof and does not find a similar attribute, the attribute comparison unit 106 determines that the attribute of contents and the attribute of selected coordinates are not similar.

A signal output by the attributes comparison unit 106 and data of each contents sent from the terminal device 111 by the data communication unit 110 is input in the AND circuit 107. At this time, when the signal output from the attribute comparison unit 106 is a signal of "CORRECT", the AND circuit 107 outputs the contents data to the image display control unit 108. When the signal output from the attribute comparison unit 106 is a signal of "ERROR", the AND circuit 107 does not output anything. The above described processing by the AND circuit 107 is defined as processing (4). Thus, the processing (3) performs an AND operation which uses the signal of "CORRECT" as 1 and the signal of "ERROR" as 0.

In step S10, the image display control unit 108 displays the contents that have the attribute similar to the attribute of coordinates on the display unit 109. More particularly, contents output from the AND circuit 107 and information about the coordinates position detected by the selected coordinates detection unit 102 are input to the image display control unit 108. Then, the image display control unit 108 controls the display unit 109 to display the contents by placing the contents near the coordinates position. The above described processing by the image display control unit 108 is defined as processing (5).

When the data communication unit 110 receives next contents data before the processing (5) ends, the data storage unit 115 including a buffer memory stores the contents data. Thus, as soon as the processing of the preceding contents ends, the processing of the next contents can be started.

In step S211, the attribute comparison unit 106 determines whether the above described comparison is completed on the all contents stored in the terminal device 111. When the attribute comparison unit 106 determines that the comparison is not completed on the all contents (NO in step S211), processing returns to step S205. On the other hand, when the attribute comparison unit 106 determines that the comparison is completed on the all contents (YES in step S211), processing ends.

For example, when the terminal device 111 stores n-kinds (n is a positive integer) of contents, the processing (1) to the processing (5) are performed n times about all contents, so that the display unit 109 can simultaneously display the contents which have similar attributes.

Figure 3:
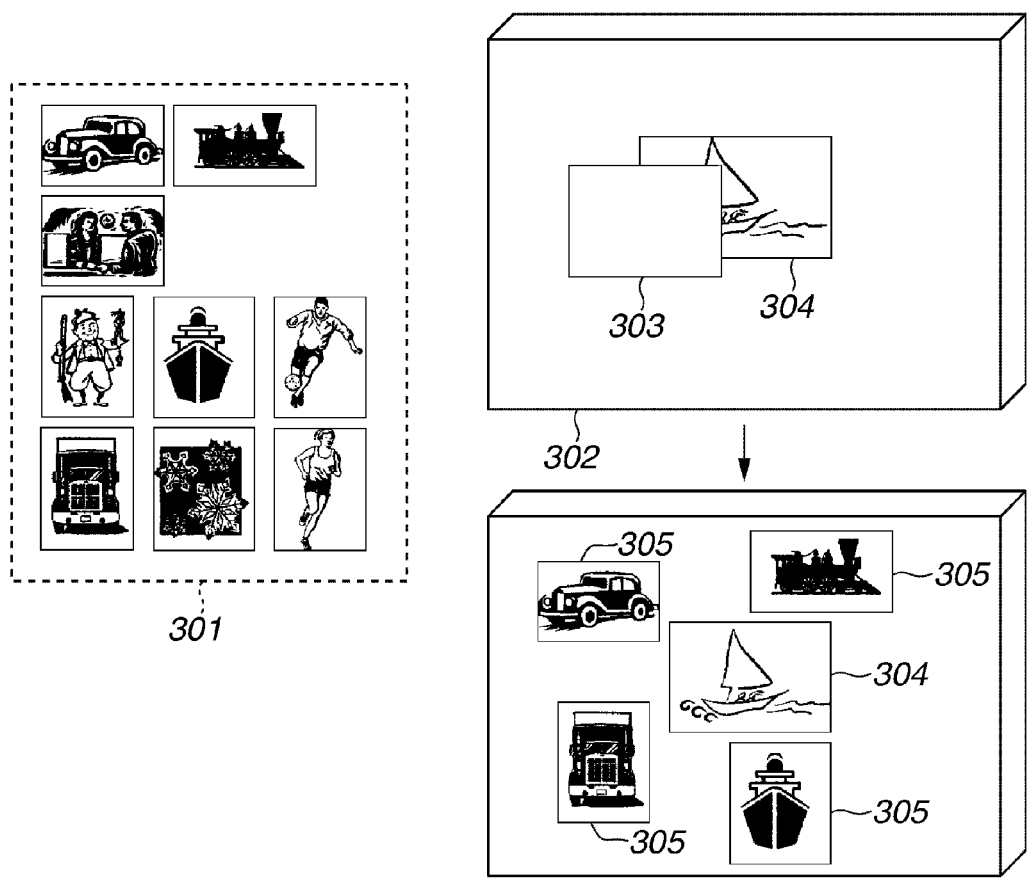
FIG. 3 illustrates an example of a screen displaying contents having similar attributes.

FIG. 3 illustrates an example of a screen displaying contents which have similar attributes in the present exemplary embodiment.

In FIG. 3, the terminal device 111 stores a plurality of contents 301. A yacht image 304 is displayed on a screen 302. For example, a display screen 303 of the terminal device 111 is in contact with the screen 302, and selects the yacht image 304. At this time, if the coordinates of the yacht image 304 has an attribute of "CARRIAGE", the screen 302 displays images 305 which have attributes similar to "CARRIAGE" around the yacht image 304.

According to the present exemplary embodiment, the image display system extracts an attribute of the detected coordinates and an attribute of the contents received from the terminal device, and displays the contents which have the similar attribute on a position near the position of the detected coordinates. Therefore, the image display system can select the contents which have similar attributes from a contents group, and easily display the contents. Thus, the image display system can remove a complicated operation for selecting images one by one and pasting the images.

Each unit configuring the image display device and each process of the image display method in the present exemplary embodiment of the present invention can be realized by operating a program stored in a random access memory (RAM) or a read only memory (ROM) of a computer. The present invention includes the program and a computer readable storage medium storing the program.

For example, the present invention can include an embodiment as a system, a device, a method, a program, or a storage medium. More particularly, the present invention can be applied to a system configured with a plurality of devices, and can be applied to an apparatus configured with one device.

The present invention includes an exemplary embodiment which directly or remotely supplies a software program for realizing the functions of the above described exemplary embodiment of the present invention (a program corresponding to the flowchart illustrated in FIG. 2 of the present exemplary embodiment) to a system or a device. The present invention includes an embodiment in which a computer in the system or the device reads a program code of the supplied program and executes the program to realize the functions of the above described exemplary embodiment.

Therefore, a program code installed in the computer for realizing the functional processing of the present invention by the computer is for realizing the present invention. The present invention includes a computer program itself for realizing the functional processing of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-291028, filed Nov. 13, 2008, which is hereby incorporated by reference herein in its entirety.

What is claimed is:

1. An image display device comprising:
    a detection unit configured to detect a terminal device which holds image data, and to detect a position on a display unit based on the detected result of the terminal device;
    an extraction unit configured to extract an attribute related to an object displayed at the position detected by the detection unit;
    an obtaining unit configured to obtain image data held in the terminal device, based on the attribute extracted by the extraction unit; and
    a display control unit configured to display the image data obtained by the obtaining unit on the display unit.

2. The image display device according to claim 1, wherein the detection unit detects coordinates of the position on which the terminal device is in contact with the display unit.

3. An image display system which comprises an image display device and a terminal device according to claim 1.

4. A method for causing an image display device to display an image, the method comprising:
    detecting a terminal device which holds image data and detecting a position on a display unit based on the detected result of the terminal device;
    extracting an attribute related to an object displayed at the position detected;
    obtaining image data held in the terminal device, based on the attribute extracted; and
    displaying the image data obtained on the display unit.

5. The method according to claim 4, further comprising:
    detecting coordinates of the position on which the terminal device is in contact with the display unit.

6. A non-transitory computer readable storage medium which stores a program for causing a computer to execute a method for causing an image display device to display an image, the method comprising:
    detecting a terminal device which holds image data and detecting a position on a display unit based on the detected result of the terminal device;
    extracting an attribute related to an object displayed at the position detected;
    obtaining image data held in the terminal device, based on the attribute extracted; and
    displaying the image data obtained on the display unit.

7. The image display device according to claim 1, wherein the obtaining unit obtains image data which is held in the terminal device and has an attribute relating to the attribute extracted by the extraction unit.

8. The image display device according to claim 1, wherein the obtaining unit obtains, by using a communication unit, an attribute of image data held in the terminal device, further comprising:
    a comparison unit configured to compare the obtained attribute of image data with the attribute of the coordinates extracted by the extraction unit,
    wherein the obtaining unit obtains, in a case where the obtained attribute of image data relates to the attribute of the coordinates extracted by the extraction unit, the image data held in the terminal device.

9. The method according to claim 4, wherein the obtaining obtains image data which is held in the terminal device and has an attribute relating to the attribute extracted.

10. The method according to claim 4, wherein the obtaining obtains, by using a communication unit, an attribute of image data held in the terminal device, further comprising:
    comparing the obtained attribute of image data with the attribute of the coordinates extracted,
    wherein the obtaining obtains, in a case where the obtained attribute of image data relates to the attribute of the coordinates extracted, the image data held in the terminal device.

11. The image display device according to claim 1, wherein the obtaining unit obtains the image data held in the terminal device via a communication channel.

12. The method according to claim 4, wherein the obtaining obtains the image data held in the terminal device via a communication channel.

* * * * *